United States Patent
Artman et al.

(10) Patent No.: US 10,671,132 B2
(45) Date of Patent: Jun. 2, 2020

(54) IHS COMPONENT COOLING SYSTEM

(71) Applicant: Dell Products L.P., Round Rock, TX (US)

(72) Inventors: Paul T. Artman, Austin, TX (US); Dominick Adam Lovicott, Round Rock, TX (US); Hasnain Shabbir, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 452 days.

(21) Appl. No.: 15/011,008

(22) Filed: Jan. 29, 2016

(65) Prior Publication Data

US 2016/0147270 A1 May 26, 2016

Related U.S. Application Data

(63) Continuation of application No. 13/404,761, filed on Feb. 24, 2012, now Pat. No. 9,250,664.

(51) Int. Cl.
*G06F 1/20* (2006.01)

(52) U.S. Cl.
CPC ............ *G06F 1/206* (2013.01); *G06F 1/203* (2013.01); *Y02D 10/16* (2018.01)

(58) Field of Classification Search
CPC .......... G06F 1/206; G06F 1/203; Y02D 10/16
USPC ....................................................... 700/300
See application file for complete search history.

(56) References Cited

U.S. PATENT DOCUMENTS

| | | | |
|---|---|---|---|
| 2007/0067136 A1 | 3/2007 | Conroy et al. | |
| 2009/0195091 A1* | 8/2009 | Nakahara | G01K 7/42 310/53 |
| 2010/0083018 A1 | 4/2010 | Park et al. | |
| 2010/0134959 A1* | 6/2010 | Fife | H02M 7/003 361/678 |
| 2010/0228403 A1 | 9/2010 | Eto | |
| 2011/0204837 A1 | 8/2011 | Tan | |
| 2011/0320061 A1 | 12/2011 | Chen | |
| 2012/0209449 A1 | 8/2012 | Alon | |
| 2013/0226364 A1 | 8/2013 | Artman et al. | |
| 2013/0246820 A1 | 9/2013 | Branover et al. | |

* cited by examiner

*Primary Examiner* — Anthan Tran
(74) *Attorney, Agent, or Firm* — Haynes and Boone, LLP

(57) ABSTRACT

An IHS includes an IHS chassis. A processor is located in the IHS chassis. At least one fan is located in the IHS chassis and in fluid communication with the processor. A temperature sensor is located in the IHS chassis. A fan controller is coupled to the processor, the at least one fan, the temperature sensor, and a storage device that includes a plurality of processor target temperatures that are each associated with a different ambient temperature. The fan controller is operable to receive a first ambient temperature from the temperature sensor, determine a first processor target temperature that is associated with the first ambient temperature, receive a temperature of the processor, and operate the at least one fan in order to reduce the temperature of the processor to the first processor target temperature.

20 Claims, 4 Drawing Sheets

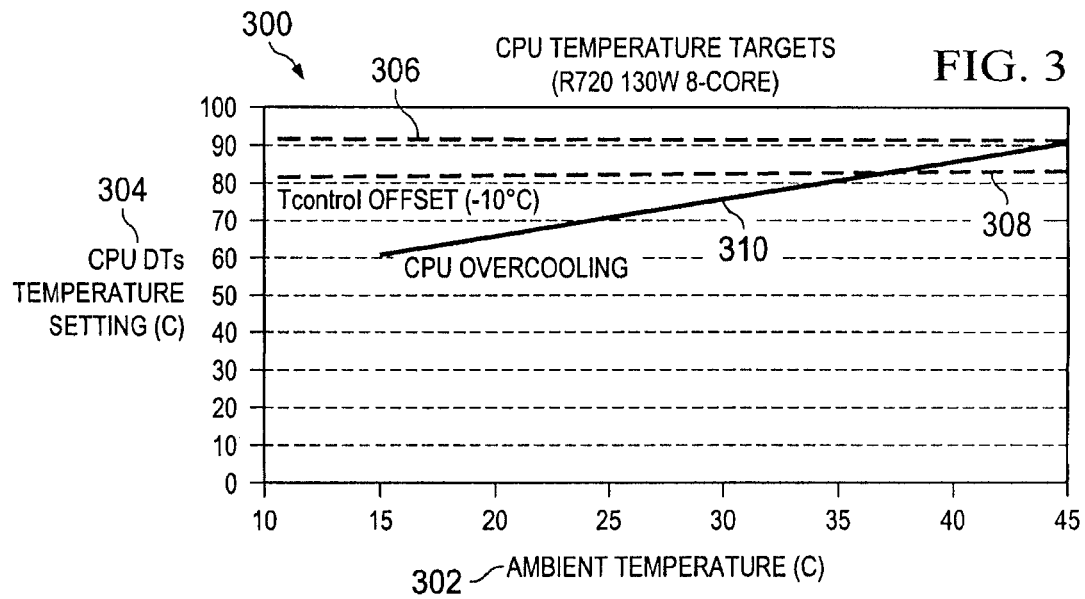
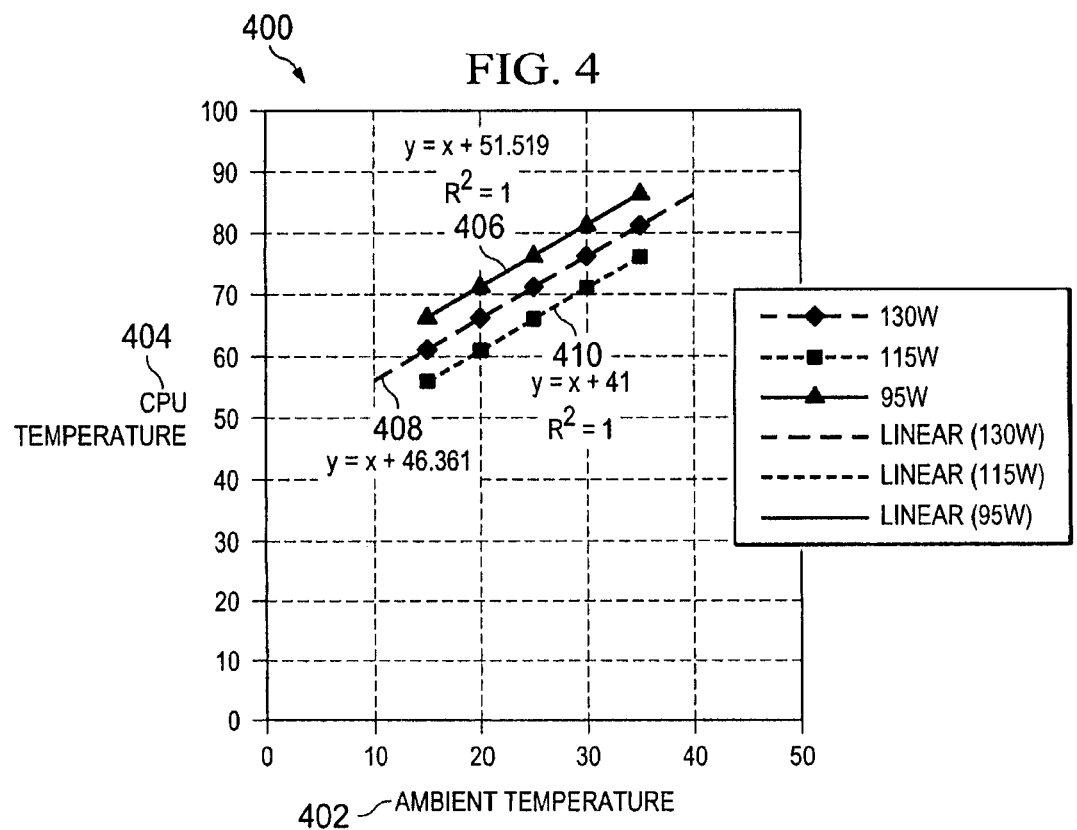

IHS COMPONENT COOLING SYSTEM

CROSS-REFERENCE TO RELATED APPLICATIONS

This is a Continuation application to U.S. Utility application Ser. No. 13/404,761, filed Feb. 24, 2012, entitled "IHS COMPONENT COOLING SYSTEM," the disclosure of which is incorporated herein by reference in their entirety.

BACKGROUND

The present disclosure relates generally to information handling systems (IHSs), and more particularly to an IHS component cooling system to minimize power consumption As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Conventionally, reductions in power consumption in an IHS are realized by minimizing fan speeds and operating IHS components at or near their temperature limits. Such conventional approaches are effective as long as the power consumption of the IHS components is a weak function of the temperature of the IHS components, in which case the power saved by reductions in the fan speeds outweighs any resulting variations in the power consumption of the IHS component.

However, the power consumption of some IHS components may increase as a function of the temperature of those IHS components. For example, processors may leak power during operation. One of skill in the art will recognize that as the number of processors components such as, for example, processor gates, have increased in number while also becoming smaller and smaller, the power leaked by those processor components has increased. Furthermore, such power leakage may increase as a function of the temperature of the processor. While the temperature of such processors can be controlled by increasing the speed of associated fan(s), fan power consumption increases at a cubic rate of fan speed while processor cooling as a function of fan speed is non linear, and thus the power consumption required to reduce the temperature of the processor can be highly non-linear.

Processors are typically overcooled to a constant offset temperature that is an offset of their control temperature. It has been found that while, at low ambient temperatures, overcooling the processor to the constant offset temperature may minimize the total power consumption of the system, doing so at high ambient temperatures in many instances does not, as the power consumed by the fans to cool the processor may become greater than the power consumed by the processor at the temperature to which it is cooled.

Accordingly, it would be desirable to provide an improved IHS component cooling system.

SUMMARY

According to one embodiment, an information handling system (IHS) component cooling system includes an IHS component, at least one fan in fluid communication with the IHS component, and a fan controller coupled to the IHS component, the at least one fan, and a storage device that includes a plurality of IHS component target temperatures that are each associated with a different ambient temperature, wherein the fan controller is operable to receive a first ambient temperature, determine a first IHS component target temperature that is associated with the first ambient temperature, receive a temperature of the IHS component, and operate the at least one fan in order to reduce the temperature of the IHS component to the first IHS component target temperature.

BRIEF DESCRIPTION OF THE DRAWINGS

FIG. 3 is a graph illustrating an embodiment of an IHS component cooling system characterization.

FIG. 4 is a graph illustrating an embodiment of an IHS component cooling system characterization.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
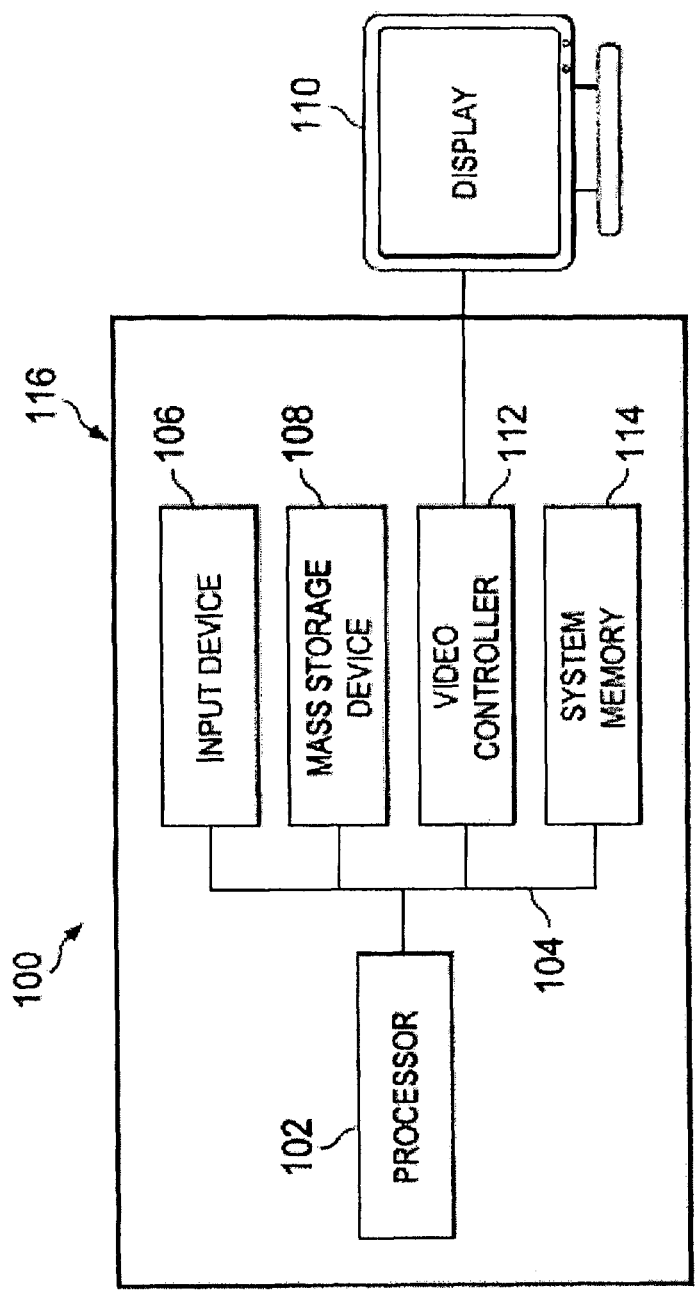
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
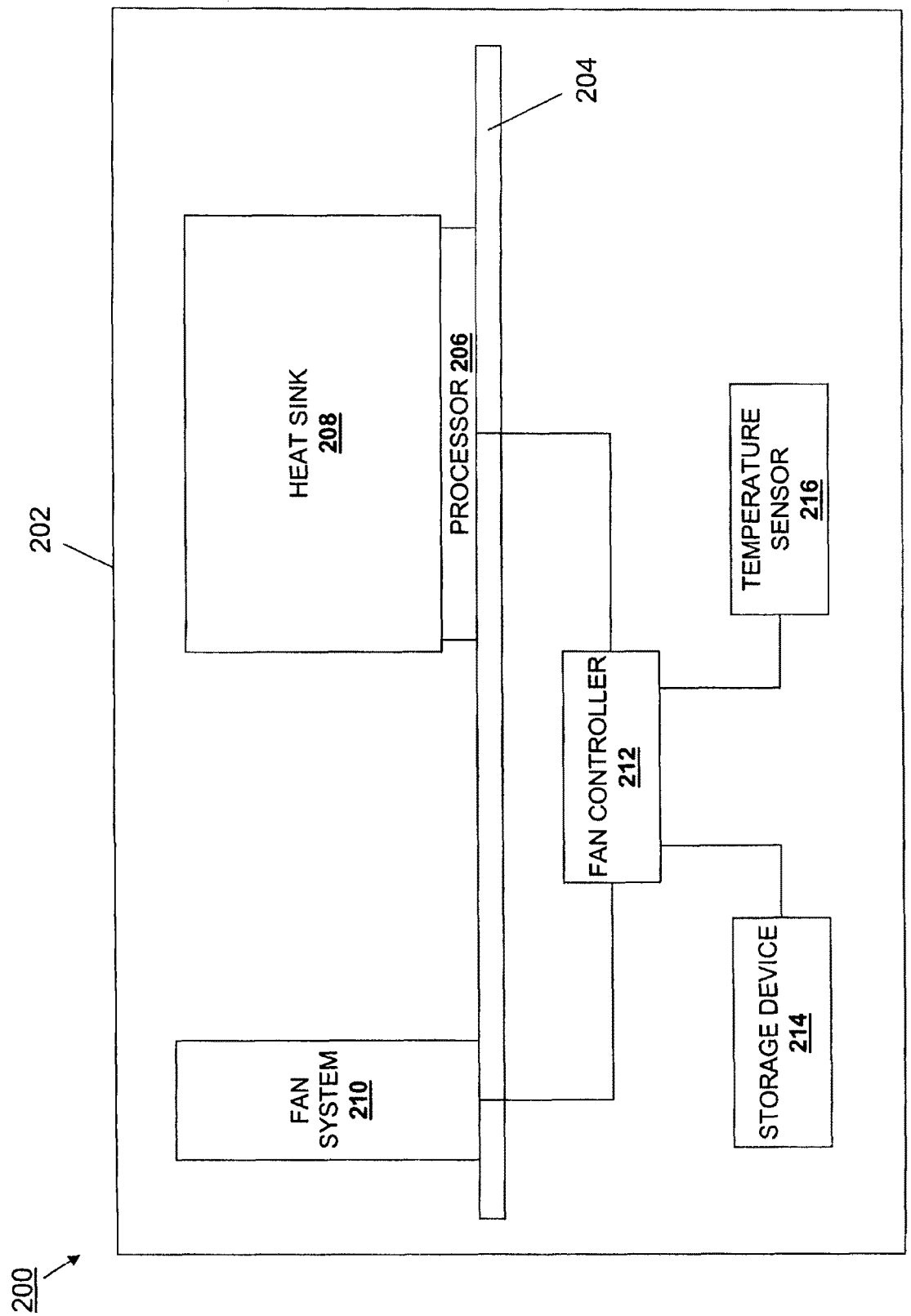
FIG. 2 is a schematic view illustrating an embodiment of an IHS component cooling system.

Referring now to FIG. 2, an IHS component cooling system 200 is illustrated. The IHS component cooling system 200 may be included in the IHS 100, discussed above with reference to FIG. 1. The IHS component cooling system 200 includes a chassis 202, which may be the chassis 116 discussed above with reference to FIG. 1. A circuit board 204 is housed in the chassis 202 and may include, for example, a motherboard, a card, and/or a variety of other circuit boards know in the art. An IHS component, illustrated in FIG. 2 as a processor 206 that may be the processor 102 discussed above with reference to FIG. 1, is mounted to the circuit board 204 and housed in the chassis 202. While the IHS component in the IHS component cooling system 200 is illustrated and described as a processor, one of skill in the art will recognize that a variety of other IHS components or component combinations that require cooling will fall within the scope of the present disclosure. A heat sink 208 is thermally coupled to the processor 206 using methods known in the art and housed in the chassis 202. A fan system 210 is located in or coupled to the chassis 202 such that the fan system 210 is in fluid communication with the heat sink 208 and/or the processor 206. The fan system 210 may include one or more fans that are operable to produce a fluid/air flow that is used to cool the processor 206. A fan controller 212 is coupled to the processor 206 and the fan system 210. In an embodiment, the fan controller 212 may include hardware and/or software, using methods known in the art, in order to provide the functionality of the fan controller 212 described below. A storage device 214 is coupled to the fan controller 212 and may include, for example, the mass storage device 108 discussed above with reference to FIG. 1, the system memory 114 discussed above with reference to FIG. 1, and/or a variety of other storage devices known in the art. A temperature sensor 216 is coupled to the fan controller 212 and may include a variety of thermal and/or temperature sensors known in the art.

In experimental embodiments using systems such as and/or similar to the IHS component cooling system 200, it has been found that the optimal fan speeds that balance power leakage from the processor 206 and fan power consumption of the fan system 210 will vary based on the performance of the heat sink 208. For example, at relatively low ambient temperatures, relatively low airflow rates produced by relatively low fan speeds of the fan system 210 are typically sufficient to cool the processor 206, and the heat sink performance curve is relatively steep such that relatively small changes in the fan speed/airflow rate will yield relatively large changes in the temperature of the processor. Furthermore, these relatively small changes in fan speed/ airflow rates produce relatively small changes in fan power consumption. Thus, at relatively low ambient temperatures, it has been found that the processor 206 can be overcooled to provide significant savings of total system power (e.g., the total power consumed by processor 206 and the fan system 210.)

However, at relatively high ambient temperatures, relatively high airflow rates produced by relatively high fan speeds of the fan system 210 are typically needed to cool the processor 206 (e.g., due to the relatively high temperature of the inlet air). In these relatively high ambient temperature environments, the heat sink performance curve is relatively flat such that relatively large changes in the fan speed/ airflow rate are required to effect the same temperature changes in the processor 206 that are provided at relatively low ambient temperatures. Furthermore, these relatively large changes in fan speed/airflow rate produce relatively large changes in fan power consumption. Thus, it has been found that in relatively higher ambient temperature environments, total system power may be minimized by reducing the fan speeds/airflow rates provided by the fan system 210, as overcooling of the processor 206 becomes inefficient as the additional power consumption of the fan system 210 required to provide the cooling is outweighed by the power consumed by the processor 206 (e.g. the power used to operate the processor plus the power leaked by the processor) at the reduced temperature.

In an embodiment, the IHS component cooling system 200 provides for the cooling of processor 206 while minimizing the total power consumed by the system by characterizing the power leakage of the processor 206 and the fan power consumption of the fan system 210 during the development of the IHS component cooling system 200. In an embodiment, stress tests may be run across varying ambient temperatures and fan system 210 fan speeds. Results from this characterization may then be used to produce component temperature target curves that are functions of the ambient temperature environments that the IHS component cooling system 200 is expected to experience.

In an embodiment, the IHS component cooling system characterization may be conducted as a function of processor power, processor temperature, and fan system power consumption at different ambient temperatures while the processor is operated or "stressed" to characterize both the processor power leakage and the performance of the heat sink 208 as a function of the fan speeds of the fan system 210. In an embodiment, the IHS component cooling system characterization may also be performed across thermal design powers to account for differences in processor power leakage across different thermal design powers. In other embodiments, the IHS component cooling system characterization may be performed across different processor frequencies and/or a variety of other IHS component properties known in the art.

Referring now to FIG. 3, an IHS component cooling system characterization 300 is illustrated that may be created as described above. In the embodiment illustrated in FIG. 3, the IHS component cooling system characterization 300 has been created for a processor IHS component and includes a graph having ambient temperatures 302 on the X-axis and processor target temperatures 304 on the Y-axis. A processor control temperature 306 is illustrated by a first dashed line at a processor target temperature of approximately 92 degrees Celsius, and a processor control temperature offset 308 is illustrated by a second dashed line at a processor target temperature of approximately 82 degrees Celsius. One of skill in the art will recognize the processor control temperature offset 308 as the constant temperature to which conventional systems typically cool their processor. A component target temperature function 310 is illustrated extending between an ambient temperature of 15 degrees Celsius and an ambient temperature of 45 degrees Celsius. In the illustrated embodiment, the component target temperature function 310 is illustrated as a linear, continuous function that depends on the ambient temperature. However, component target temperature functions may be curved, discontinuous, and/or include a variety of other function properties known in the art while remaining within the scope of the present disclosure. In an embodiment, the data associated with the IHS component cooling system characterization 300 and/or any of its components (e.g., the component target temperature function 310) may be included in the storage device 214 of the IHS component cooling system 200.

Referring now to FIG. 4, an IHS component cooling system characterization 400 is illustrated that may be created as described above. In the embodiment illustrated in FIG. 4, the IHS component cooling system characterization 400 has been created for a plurality of processor IHS components and includes a graph having ambient temperatures 402 on the X-axis and processor target temperatures 404 on the Y-axis. A first component target temperature function 406 for a processor with a thermal design power of 95 watts is illustrated extending between an ambient temperature of 15 degrees Celsius and an ambient temperature of 45 degrees Celsius. A second component target temperature function 408 for a processor having a thermal design power of 115 watts is illustrated extending between an ambient temperature of 15 degrees Celsius and an ambient temperature of 45 degrees Celsius. A third component target temperature function 410 for a processor having a thermal design power of 130 watts is illustrated extending between an ambient temperature of 15 degrees Celsius and an ambient temperature of 45 degrees Celsius. In the illustrated embodiment, the component target temperature functions 406, 408, and 410 are illustrated as linear, continuous functions that depends on the ambient temperature and thermal design powers. However, component target temperature functions may be curved, discontinuous, and/or include a variety of other function properties known in the art while remaining within the scope of the present disclosure. In an embodiment, the data associated with the IHS component cooling system characterization 400 and/or any of its components (e.g., the component target temperature functions 406, 408, and 410) may be included in the storage device 214 of the IHS component cooling system 200. One of skill in the art will recognize that characterization of the IHS component cooling system at different thermal design powers may account for differences in processor power leakage across different thermal design power bins.

Figure 5:
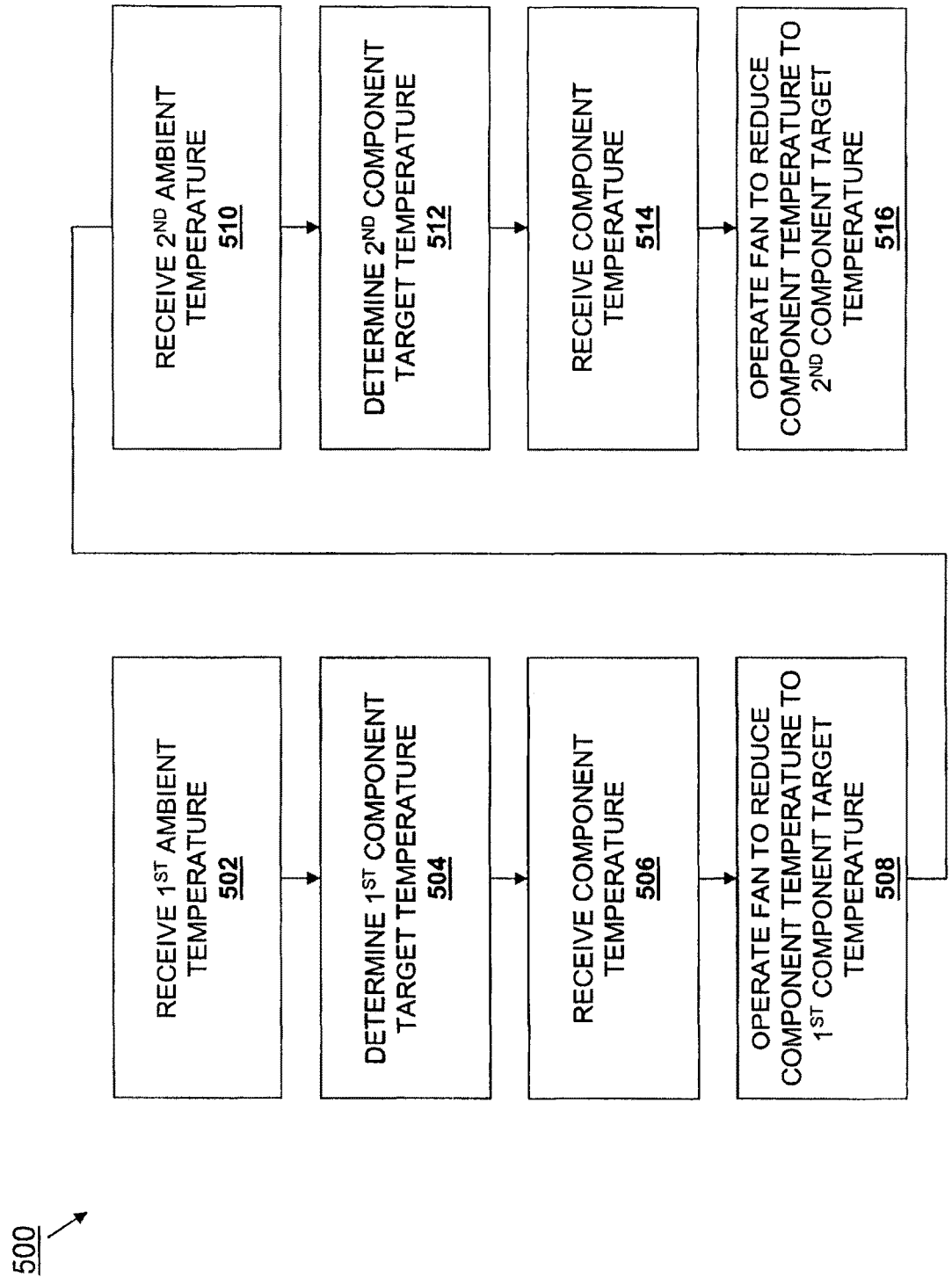
FIG. 5 is a flow chart illustrating an embodiment of a method for cooling a component.

Referring now to FIGS. 2 and 5, a method 500 for component cooling is illustrated. In the embodiment discussed below, the method 500 is described and illustrated as cooling a processor. However, one of skill in the art will recognize that the method 500 may be applied to a variety of IHS components while remaining within the scope of the present disclosure. The method 500 begins at block 502 where a first ambient temperature is received. In an embodiment, the temperature sensor 216 is operable to determine an ambient temperature and provide that ambient temperature to the fan controller 212.

Referring now to FIGS. 2, 3, 4, and 5, the method 500 then proceeds to block 504 where a first component target temperature is determined. In an embodiment, the fan controller 212 may access an IHS component cooling system characterization in the storage device 214 and, using the ambient temperature received at block 502 of the method 500, retrieves a first component target temperature. For example, using the component target temperature function 310 in the IHS component cooling system characterization 300, illustrated in FIG. 3, and an ambient temperature of 15 degrees Celsius, the fan controller 214 may retrieve a processor target temperature/first component target temperature of approximately 61 degrees. Similarly, using the component target temperature function 310 in the IHS component cooling system characterization 300, an ambient temperature of 20 degrees Celsius will retrieve a processor target temperature/first component target temperature of approximately 65 degrees Celsius, an ambient temperature of 25 degrees Celsius will retrieve a processor target temperature/first component target temperature of approximately 71 degrees Celsius, an ambient temperature of 30 degrees Celsius will retrieve a processor target temperature/first component target temperature of approximately 75 degrees Celsius, an ambient temperature of 35 degrees Celsius will retrieve a processor target temperature/first component target temperature of approximately 80 degrees Celsius, an ambient temperature of 40 degrees Celsius will retrieve a processor target temperature/first component target temperature of approximately 85 degrees Celsius, and an ambient temperature of 45 degrees Celsius will retrieve a processor target temperature/first component target temperature of approximately 91 degrees Celsius.

In an embodiment, the fan controller 212 may access an IHS component cooling system characterization in the storage device 214, retrieve a thermal design power, and using the ambient temperature received at block 502 of the method 500, retrieve a first component target temperature. For example, the fan controller 214 may determine a thermal design power for the processor 206 by, for example, retrieving thermal design power information from the processor 206, the storage device 214, and/or from a variety of other thermal design power information locations known in the art. Using the IHS component cooling system characterization 400, illustrated in FIG. 4, the thermal design power, and the ambient temperature retrieved in block 502 of the method 500, the fan controller 214 may retrieve a processor target temperature/first component target temperature. As can be seen from the first component target temperature function 406 in the IHS component cooling system characterization 400 for a 95 watt thermal design power, ambient temperatures of 15, 20, 25, 30, and 35 degrees Celsius return processor target temperature/first component target temperatures of approximately 66, 71, 76, 81, and 85 degrees, respectively. Similarly, as can be seen from the second component target temperature function 408 in the IHS component cooling system characterization 400 for a 115 watt thermal design power, ambient temperatures of 15, 20, 25, 30, and 35 degrees Celsius return processor target temperature/first component target temperatures of 62, 66, 72, 76, and 81 degrees, respectively. Similarly, as can be seen from the third component target temperature function 410 in the IHS component cooling system characterization 400 for a 130 watt thermal design power, ambient temperatures of 15, 20, 25, 30, and 35 degrees Celsius return processor target temperature/first component target temperatures of 56, 61, 66, 71, and 76 degrees, respectively.

While a plurality of IHS component cooling system characterizations having a variety of component target temperature functions have been illustrated and described above, one of skill in the art will recognize that the system characterizations and target temperature functions may be varied while remaining within the scope of the present disclosure. Thus, target temperature functions may depend on variables other than, or in addition to, ambient temperature and thermal design power while remaining within the scope of the present disclosure.

Referring now to FIGS. 2 and 5, the method 500 then proceeds to block 506 where a component temperature is received. In an embodiment, the fan controller 212 retrieves the temperature of the processor 206 from a temperature sensor in the processor and/or using a variety of other component temperature retrieval methods known in the art. The method 500 then proceeds to block 508 where one or more fans are operated to reduce the component temperature to the first component target temperature. In an embodiment, the fan controller 212 operates the fan system 210 in order to provide an airflow to the processor 206 and heat sink 208 that causes the temperature of the processor 206 to be reduced from the component temperature received at block 506 of the method 500 to the first component target temperature determined in block 504 of the method 500. Using methods known in the art, the fan controller 212 is operable to operate one or more fans in the fan system 210 at fan speeds that reduce the temperature of the processor 206 to a desired temperature. For example, given the component target temperature and the component temperature, the fan controller 212 may access a fan speed chart in the storage device 214 to determine the appropriate fan speeds of the fans in the fan system 210 to reduce the temperature of the processor 206 from the component temperature to the component target temperature.

The method 500 then proceeds to block 510 where a second ambient temperature is received in substantially the same manner as described above for the first ambient temperature in block 502 of the method 500. As is known in the art, the ambient temperature experienced by the system may change, and at block 510 of the method 500, that ambient temperature change is detected as a second ambient temperature that is different from the first ambient temperature received in block 502 of the method 500. The method 500 then proceeds to block 512 where a second component target temperature is determined in substantially the same manner as described above for the first component target temperature in block 504 of the method 500. Thus, using the second ambient temperature received in block 510 of the method 500, the fan controller 212 may use the IHS component cooling system characterizations 300 and/or 400 and, in some embodiments, a determined thermal design power, to determine a second component target temperature. As will be understood by one of skill in the art, the changing ambient temperature will result in different component target temperature in the IHS component cooling system 200 according to the component target temperature functions. The method 500 then proceeds to block 514 where a component temperature is received in substantially the same manner as described above for the component temperature in block 506. The method 500 then proceeds to block 516 where one or more fans are operated to reduce the component temperature received at block 514 of the method 500 to the second component target temperature determined at block 512 of the method 500 in substantially the same manner as described above with regard to the first component target temperature in block 508 of the method 500.

Thus, the method 500 illustrates how the IHS component cooling system 200 cools a component to target temperature that is dependent on the ambient temperature. As described above, the component is cooled to a first component target temperature based on a first received ambient temperature, and then cooled to a second component target temperature based on a second received ambient temperature. One of skill in the art will recognize how the method 500 may be repeated in order to continuously adjust the component target temperature as the ambient temperature changes. As can be seen in the IHS component cooling system characterization 300 illustrated in FIG. 3, such ambient temperature dependent cooling may provide for the significant overcooling of a processor (e.g., relative to the processor control temperature offset 308 to which the processor is cooled to by conventional systems) for ambient temperatures between 15 and 35 degrees Celsius, while cooling the processor between its processor control temperature 306 and its processor control temperature offset 308 for ambient temperatures between 35 and 45 degrees Celsius. At relatively low ambient temperatures, the processor may be significantly overcooled (e.g., cooled significantly below its processor control temperature 306) to minimize the processor power leakage, thus minimizing system power consumption. However, at relatively high ambient temperatures, the processor temperature may be cooled closer to its processor control temperature 306 to reduce the power consumption of the fan system, thus minimizing system power consumption. In some embodiments, at relatively higher ambient temperatures, the processor may be cooled to a temperature that is above its processor control temperature 306 (e.g., according to the Intel® Digital Thermal Sensor (DTS) specification).

One of skill in the art will recognize that total system power consumption that includes a first power that is consumed by the fan system and a second power that is consumed by the processor may minimized by operating the IHS component cooling system according to the method 500 discussed above (e.g., the component target temperature function may provide a processor target temperature that results in a fan system operating condition that minimizes the power consumed by the combination of the processor (due to, for example, operation and power leakage) and the fan system.)

In experimental embodiments, a server utilizing an Intel® R720 dual socket processor was operated according to the IHS component cooling system characterization 300 illustrated in FIG. 3, and the power consumption of the system was compared to the power consumed by the system when operated according to the Intel DTS thermal profile in which the processor was cooled to a constant processor control temperature offset. At 20 degrees Celsius, a power savings of 9 watts was realized over the Intel DTS thermal profile, while at 45 degrees Celsius, a power savings of greater than 20 watts was realized. Thus, a system and method have been described that change the target temperature to which a component should be cooled based on the ambient temperature experienced by the system, which allows for the minimization of the total power consumed by the combination of the component and the fan system when operating the component along with the fan system to cool the component.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:
1. A component cooling system, comprising:
    a component;

at least one fan in fluid communication with the component; and a fan control system that is coupled to the component and the at least one fan, wherein the fan control system is configured to:
 receive, during a heat generating operation of the component, a first current ambient temperature from a first temperature sensor coupled to the fan control system;
 detect an ambient temperature change based on the first current ambient temperature and, in response, determine a first component target temperature that is associated with the first current ambient temperature; and
 operate the at least one fan in order to reduce a component temperature of the component that was received from a second temperature sensor to the first component target temperature.

2. The system of claim 1, further comprising:
a memory system that stores a plurality of component target temperatures that are each associated with a different ambient temperature, wherein the fan control system determines the first component target temperature that is associated with the first current ambient temperature using the plurality of component target temperatures each associated with a different ambient temperature in the memory system.

3. The system of claim 2, wherein the plurality of component target temperatures that are each associated with a different ambient temperature in the memory system are provided in a continuous component target temperature function that is a function of ambient temperature.

4. The system of claim 2, wherein the plurality of component target temperatures that are each associated with a different ambient temperature in the memory system are provided in a discontinuous component target temperature function that is a function of ambient temperature.

5. The system of claim 2, wherein the plurality of component target temperatures include a first set of component target temperatures that are each associated with a first component property and a second set of component target temperatures that are each associated with a second component property.

6. The system of claim 1, wherein in response to operating the at least one fan in order to reduce the component temperature to the first component target temperature, a total system power consumption is minimized, and wherein the total system power consumption includes a first power that is consumed by the at least one fan and a second power that is consumed by the component.

7. The system of claim 1, wherein the fan control system is configured to:
 receiving a second current ambient temperature from the first temperature sensor subsequent to determining the first current ambient temperature, wherein the second current ambient temperature is different than the first current ambient temperature;
 determine a second component target temperature that is associated with the second current ambient temperature in the memory system, wherein the second component target temperature is different than the first component target temperature; and
 operate the at least one fan in order to reduce the component temperature of the component to the second IHS component target temperature.

8. An information handing system (IHS), comprising:
a chassis;
a processing system that is located in the chassis and that includes a first temperature sensor;
at least one fan located in the chassis and in fluid communication with the processing system;
a second temperature sensor; and
a fan control system coupled to the processing system, the at least one fan, and the second temperature sensor, wherein the fan control system is configured to:
 receive, during a heat generating operation of the processing system, a first current ambient temperature from the second temperature sensor;
 detect an ambient temperature change based on the first current ambient temperature and, in response, determine a first processing system target temperature that is associated with the first current ambient temperature; and
 operate the at least one fan in order to reduce a processing system temperature of the processing system that was received from the first temperature sensor to the first processing system target temperature.

9. The IHS of claim 8, further comprising:
a memory system that is coupled to the fan control system and that stores a plurality of processing system target temperatures that are each associated with a different ambient temperature, wherein the fan control system determines the first processing system target temperature that is associated with the first current ambient temperature from the plurality of processing system target temperatures associated with a different ambient temperature in the memory system.

10. The IHS of claim 9, wherein the plurality of processing system target temperatures that are each associated with a different ambient temperature in the memory system are provided in a continuous processing system target temperature function that is a function of ambient temperature.

11. The IHS of claim 9, wherein the plurality of processing system target temperatures that are each associated with a different ambient temperature in the memory system are provided in a discontinuous processing system target temperature function that is a function of ambient temperature.

12. The IHS of claim 9, wherein the plurality of processing system target temperatures include a first set of processing system target temperatures that are each associated with a first processing system property and a second set of processing system target temperatures that are each associated with a second processing system property.

13. The IHS of claim 8, wherein in response to operating the at least one fan in order to reduce the processing system temperature to the first processing system target temperature, a total system power consumption is minimized, and wherein the total system power consumption includes a first power that is consumed by the at least one fan and a second power that is consumed by the processing system.

14. The IHS of claim 8, wherein the fan control system is configured to:
 receive a second current ambient temperature from the second temperature sensor subsequent to receiving the first current ambient temperature, wherein the second current ambient temperature is different than the first current ambient temperature;
 determine a second processing system target temperature that is associated with the second current ambient temperature in the memory system, wherein the second processing system target temperature is different than the first component target temperature; and operate the at least one fan in order to reduce the processing system temperature of the processing system to the second IHS component target temperature.

15. A method for cooling components, comprising:
receiving, by a fan control system during a heat generating operation of a component, a first current ambient temperature from a first temperature sensor;
detecting an ambient temperature change based on the first current ambient temperature and, in response, determining, by the fan control system, a first component target temperature that is associated with the first current ambient temperature; and
operating, by the fan control system, the at least one fan in order to reduce a component temperature of the component that was received from a second temperature sensor to the first component target temperature.

16. The method of claim 15, wherein the first component target temperature is associated with the first current ambient temperature in a memory system that is accessible to the fan control system and that stores a plurality of component target temperatures that are each associated with a different ambient temperature.

17. The method of claim 16, wherein the plurality of component target temperatures that are each associated with a different ambient temperature in the memory system are provided in a continuous component target temperature function that is a function of ambient temperature.

18. The method of claim 16, wherein the plurality of component target temperatures that are each associated with a different ambient temperature in the memory system are provided in a discontinuous component target temperature function that is a function of ambient temperature.

19. The method of claim 15, wherein in response to operating the at least one fan in order to reduce the temperature of the component to the first component target temperature, a total system power consumption is minimized, and wherein the total system power consumption includes a first power that is consumed by the at least one fan and a second power that is consumed by the component.

20. The method of claim 15, further comprising:
receiving, by the fan control system subsequent to determining the first current ambient temperature, a second current ambient temperature from the first sensor that is different than the first current ambient temperature;
determining, by the fan control system, a second component target temperature that is associated with the second current ambient temperature in the memory system, wherein the second component target temperature is different than the first component target temperature; and
operating, by the fan control system, the at least one fan in order to reduce the component temperature of the component to the second component target temperature.

* * * * *